(12) United States Patent  
Ayala et al.

(10) Patent No.: US 7,487,054 B2  
(45) Date of Patent: Feb. 3, 2009

(54) AUTOMATED DYNAMIC METROLOGY SAMPLING SYSTEM AND METHOD FOR PROCESS CONTROL

(75) Inventors: Javier A. Ayala, Poughkeepsie, NY (US); Marc J. Postiglione, New Milford, CT (US); Eric P. Solecky, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/908,422

(22) Filed: May 11, 2005

(65) Prior Publication Data

US 2006/0259279 A1     Nov. 16, 2006

(51) Int. Cl.  
*G06F 19/00*     (2006.01)

(52) U.S. Cl. .................. 702/81; 702/182; 700/108; 700/121

(58) Field of Classification Search ............. 702/81–84, 702/179, 34–36, 58, 59, 127, 180, 187; 700/117  
See application file for complete search history.

(56) References Cited

U.S. PATENT DOCUMENTS

| | | | |
|---|---|---|---|
| 6,859,746 B1 * | 2/2005 | Stirton | 702/83 |
| 6,922,600 B1 * | 7/2005 | Conrad et al. | 700/108 |
| 6,965,600 B2 * | 11/2005 | George | 370/392 |
| 6,965,808 B1 * | 11/2005 | Conrad et al. | 700/108 |
| 2004/0119749 A1 * | 6/2004 | Luque | 345/771 |

OTHER PUBLICATIONS

Liu, X. Q. "Analytical analysis of effect of Sampling Plan on Cpk" Proceedings of 1995 IEEE Annual International Engineering Management Conference p. 257-259.*

* cited by examiner

*Primary Examiner*—Manuel L Barbee  
(74) *Attorney, Agent, or Firm*—Steve Capella; Hoffman Warnick LLP (57) ABSTRACT

A system and method for optimizing and implementing a metrology sampling plan. A system is provided that includes a system for collecting historical metrology data from a metrology tool; and a reduction analysis system that compares an initial capability calculated from the historical metrology data with a recalculated capability for a reduced data set, wherein the reduced data set is obtained by removing a subset of data from the historical metrology data.

7 Claims, 7 Drawing Sheets

|  | 1a | 1b | 1c | 2a | 2b | 2c | 3a | 3b | 3c | 4a | 4b | 4c |
|---|---|---|---|---|---|---|---|---|---|---|---|---|
| Wafer 1 | 1 | 0 | 0 | 0 | 1 | 0 | 0 | 0 | 1 | 1 | 0 | 0 |
| Wafer 2 | 0 | 1 | 0 | 0 | 0 | 1 | 1 | 0 | 0 | 0 | 1 | 0 |
| Wafer 3 | 0 | 0 | 1 | 1 | 0 | 0 | 0 | 1 | 0 | 0 | 0 | 1 |
| Wafer 4 | 1 | 0 | 0 | 0 | 1 | 0 | 0 | 0 | 1 | 1 | 0 | 0 |
| Wafer 5 | 0 | 1 | 0 | 0 | 0 | 1 | 1 | 0 | 0 | 0 | 1 | 0 |
| Wafer 6 | 0 | 0 | 1 | 1 | 0 | 0 | 0 | 1 | 0 | 0 | 0 | 1 |
|  |  |  |  |  |  |  |  |  |  |  |  |  |

|   | C1 | C2 | C3 | C4 |
|---|----|----|----|----|
| a | 1  | 2  | 3  | 4  |
| b | 5  | 6  | 7  | 8  |
| c | 9  | 10 | 11 | 12 |
| d | 13 | 14 | 15 | 16 |
| e | 17 | 18 | 19 | 20 |
| f | 21 | 22 | 23 | 24 |

AUTOMATED DYNAMIC METROLOGY SAMPLING SYSTEM AND METHOD FOR PROCESS CONTROL

TECHNICAL FIELD

The present invention relates generally to metrology sampling methodologies, and more specifically relates to a system and method for utilizing historical data to reduce metrology sampling rates.

RELATED ART

In complex manufacturing operations, such as the fabrication of semiconductors, metrology tools are implemented to control the manufacturing processes. In particular, metrology tools provide measurements, such as film thicknesses, critical dimensions, etc., which make certain that the manufacturing processes are performing adequately by ensuring that the product being manufactured is meeting its specifications. Metrology tools can therefore play a large role in a manufacturing operation. For example, in a typical semiconductor fabrication operation, a chip may be passed through various metrology tools hundreds of times. Accordingly, a significant portion of the manufacturing life-cycle and therefore cost can be attributed to metrology operations.

One method of reducing the number of metrology operations is to implement metrology sampling, where for example, a certain percentage of wafer lots are "skipped" and not measured. Unfortunately, existing sampling strategies are typically limited to lot skip methodologies which are based on industry recommendations and/or capability, and do not vary over time for each particular metrology operation. Very little effort is put into determining whether an initial sampling strategy is optimal or not. Moreover, present sampling strategies do not consider opportunities to further reduce redundant and/or unnecessary sampling to decrease cycle-time and optimize utilization for the metrology tool set that can potentially reduce tool capacity and manufacturing costs.

The most common form of sampling utilized within the semiconductor fabrication industry involves skip lot sampling, where as noted above, a certain percentage of the wafer lots are measured and a certain percentage are skipped. The skip rate is typically determined based on a Cp/Cpk analysis in which higher Cp/Cpk values allow for greater skip rates, e.g., based on industry customs. However, within each lot selected to be measured are a set of wafers that must be measured, and within each wafer to be measured are different sites that must be measured. Accordingly, there may be sampling optimization opportunities at these different levels that are not being fully explored.

Current techniques fail to effectively evaluate the efficacy of the sampling strategies being implemented. Accordingly, in any metrology process, there may be opportunities to reduce sampling. Thus, there exists a need for a system and method for better evaluating and implementing sampling strategies.

SUMMARY OF THE INVENTION

The present invention addresses the above-mentioned problems, as well as others, by providing a metrology sampling system and method that utilizes historical data to identify optimal sampling rates for a metrology process. In a first aspect, the invention provides a system, comprising: a system for collecting historical metrology data from a metrology tool; and a reduction analysis system that compares an initial capability calculated from the historical metrology data with a recalculated capability calculated for a reduced data set, wherein the reduced data set is obtained by removing a subset of data from the historical metrology data.

In a second aspect, the invention provides a computer program product comprising a computer usable medium having computer usable code for optimizing a metrology sampling plan, comprising: computer usable program code for collecting historical metrology data from a metrology tool; and computer usable program code for comparing an initial capability calculated from the historical metrology data with a recalculated capability for a reduced data set, wherein the reduced data set is obtained by removing a subset of data from the historical metrology data.

In a third aspect, the invention provides a method for optimizing a metrology sampling plan, comprising: collecting historical metrology data from a metrology tool; and comparing an initial capability calculated from the historical metrology data with a recalculated capability for a reduced data set, wherein the reduced data set is obtained by removing a subset of data from the historical metrology data.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INEVENTION

Figure 1:
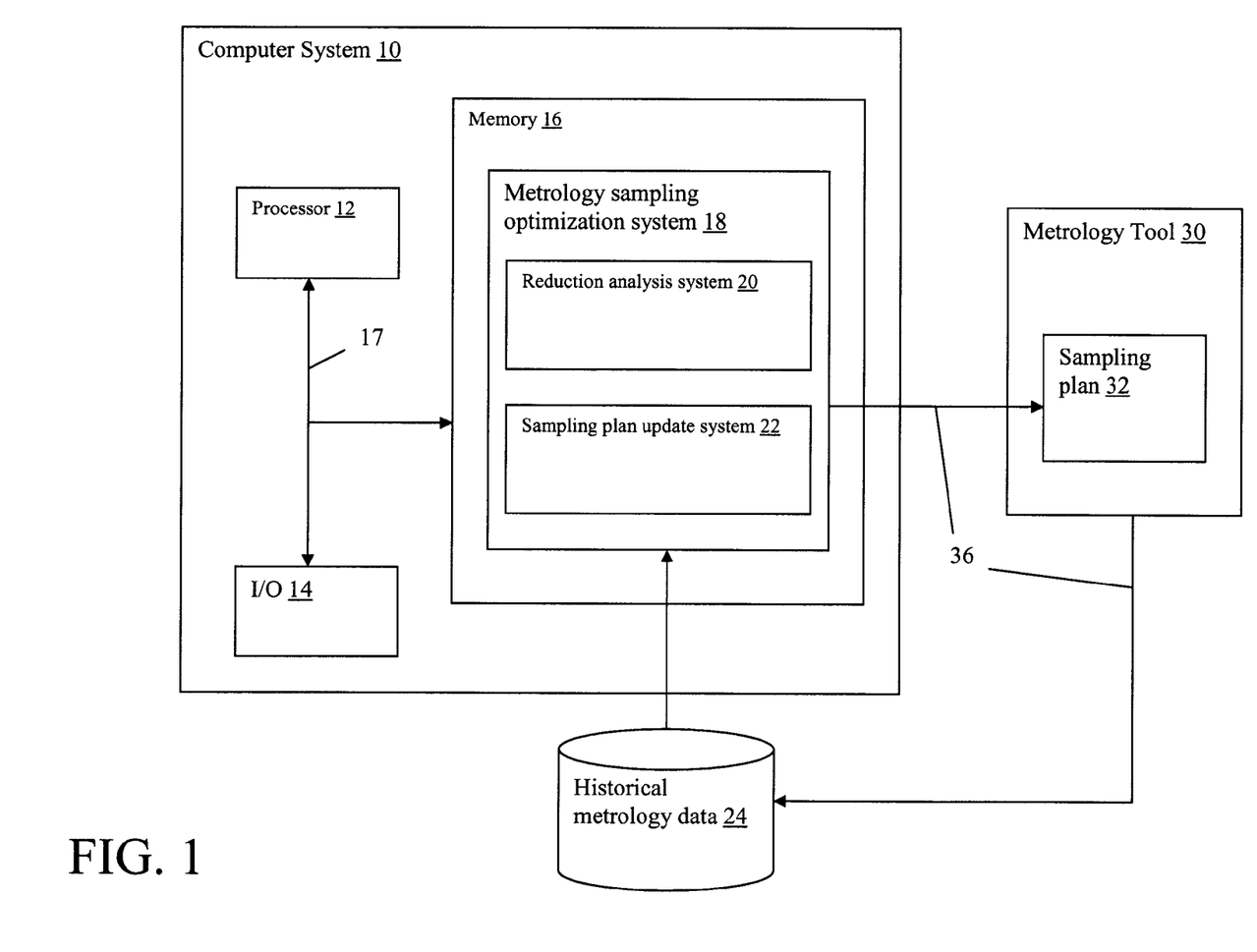
FIG. 1 depicts a computer system having a metrology optimization system in accordance with the present invention.

Referring now to the drawings, FIG. 1 depicts a computer system 10 having a metrology optimization system 18 for optimizing a sampling plan 32 for a metrology tool 30. Metrology sampling optimization system 18 includes a reduction analysis system 20 that analyzes historical metrology data 24 generated by the metrology tool 30 to determine if any of the sampling rates used by the metrology tool 30 can be reduced. Metrology sampling optimization system 18 also includes a sampling plan update system 22 for updating the sampling plan 32 based on the analysis performed by reduction analysis system 20. Details regarding the implementation of reduction analysis system 20 and sampling plan update system 22 are provided below.

It should be understood that while many of the embodiments described below relate to semiconductor fabrication, the optimization techniques described herein can be applied to any process where measurements are performed using one or more metrology tools. Moreover, it should be understood that the metrology optimizations described herein could be run any number of times and at any frequency in order to update and refine the sampling plan for a given process. For instance, in a semiconductor fabrication process, sampling plan 32 may be updated after collecting three weeks of historical metrology data 24. In other instances, metrology sampling optimization system 18 could be run just once, run daily, run weekly, etc., for a given process.

In general, computer system 10 may comprise any type of computing device for implementing metrology sampling optimization system 18, e.g., a desktop, a laptop, a workstation, etc. Moreover, computer system 10 could be implemented as part of a client and/or a server. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including metrology tool 30, a monitor/display, speakers, storage, another computer system, a hand-held device, keyboard, mouse, voice recognition system, speech output system, printer, facsimile, pager, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network 36 such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

Figure 2:
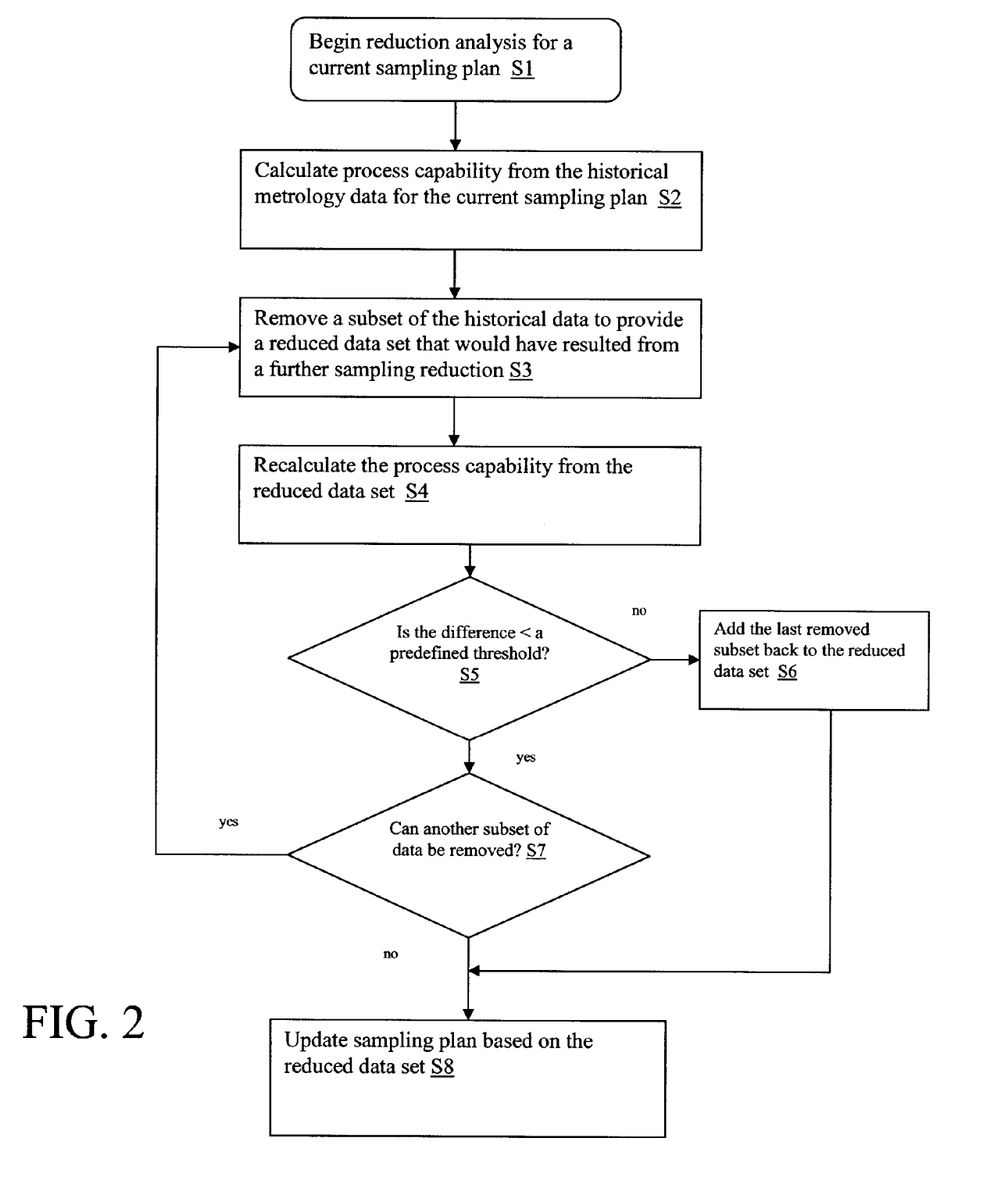
FIG. 2 depicts a flowchart showing a generic sample reduction analysis in accordance with the present invention.

Referring now to FIG. 2, a flow diagram is provided detailing a generic procedure for implementing reduction analysis system 20. At step S1, a reduction analysis, such as that provided by reduction analysis system 20, is begun for a current sampling plan 32. At step S2, a process capability is calculated from the historical metrology data 24 for the current sampling plan 32. Process capability may be calculated in any manner and include any metric, measurement, set of measurements, variances, distribution, etc. Common industry process capability metrics that may be utilized in the present invention include, but are not limited to, Cp/Cpk calculations and mean+3 sigma calculations. A mean+3 sigma calculation is where the mean is the average of the entire historical data set and 3 sigma is the standard deviation of the entire historical data set times three.

At step S3, a subset of the historical data is removed to provide a reduced data set, which represents a data set that would have resulted had more aggressive sampling been utilized in the sampling plan. Thus, for example, if the initial sampling plan called for four of the twenty five wafers in each lot to be measured by a metrology tool, and the historical data set included 4000 total data values collected from 1000 lots (i.e., four values for each lot), then one strategy would be to eliminate one additional data value from each lot in the historical data. This would result in a reduced data set of 3000 values, i.e., three data values for each lot. Thus, the reduced data set represents the data set that would have been obtained had the initial sampling plan called for measuring three wafers from each lot instead of four.

Typically, all the data within the subset being removed is related in some physical or logical sense (e.g., the subset may include data from the third wafer in each cassette of wafers being tested). Any methodology could be used to select the subset to be removed.

Next, at step S4, the process capability is recalculated for the reduced data set. At step S5, a determination is made whether the difference between the original process capability and the recalculated process capability is less than a predetermined threshold. In other words, a determination is made whether the historical data set without the subset provides substantially the same process capability result as the complete historical data set.

If the difference is less than a predetermined threshold (i.e., removal of the subset does not substantially impact process capability results), then at step S7, a determination is made whether there is another subset of data that can be removed. For instance, it may be dictated that at least one wafer from each lot must be measured. In this case, if only one wafer per lot remains in the reduced data set, then no additional subset of data can be removed. The predetermined threshold can be selected in any manner.

If another subset can be removed, then steps S3, S4 and S5 are repeated so that an additional subset of data is removed from the reduced data set, the process capability is recalculated for the further reduced data set, and the recalculated process capability is compared to the process capability calculated for the original data set. This process is then iterated as many times as possible to generate the smallest possible reduced data set. If another subset cannot be removed at step S7, then the reduction analysis is complete and the sampling plan can be updated based on the resulting reduced data set at step S8.

If at step S5, it is determined that the difference is not less than a predetermined threshold (i.e., removal of the subset substantially impacts process capability results), then at step S6, the most recently removed data subset is included back into the reduced data set, and the sampling plan can be updated based on the resulting reduced data set at step S8.

The process of updating the sampling plan essentially involves examining the resulting reduced data set to see what level of sampling provides substantially the same process capability that was provided by the initial complete set of historical data. For instance, if the resulting reduced data set included data for two wafers for each lot, then the updated sampling plan should be to sample just two wafers from each lot (as opposed to the original plan which required sampling four wafers from each lot).

Figure 3:
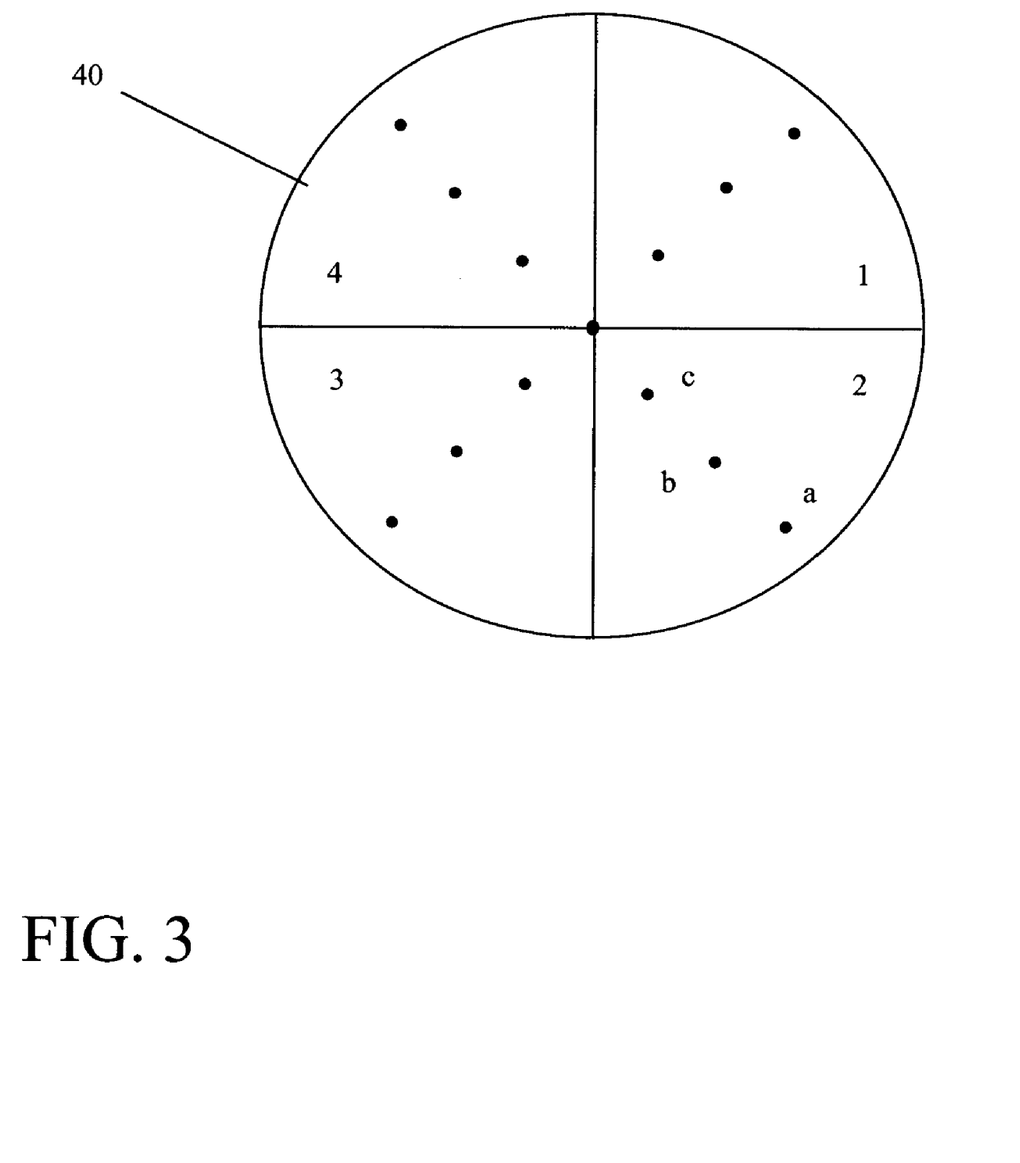
FIG. 3 depicts a wafer having various sites identified for sampling.

Two specific examples of this optimization process are described below in FIGS. 3-8, which involve wafer site (siteto-site) sampling and wafer-to-wafer sampling. Referring first to FIG. 3, a wafer site sampling plan is shown for a wafer 40. In this case, the wafer 40 is to have sites examined for both quadrant and radial effects. To achieve this, the initial plan calls for analyzing sites from each quadrant (1-4), at various radial positions (a, b and c) within each quadrant. Thus, the initial plan calls for measuring a total of 12 sites, three from each quadrant. Assuming this initial plan was put into place, and a set of historical data was captured, the metrology sampling optimization system 18 described above could be applied to the data to identify potential sampling reductions and implement an updated sampling plan 32.

Figure 4:
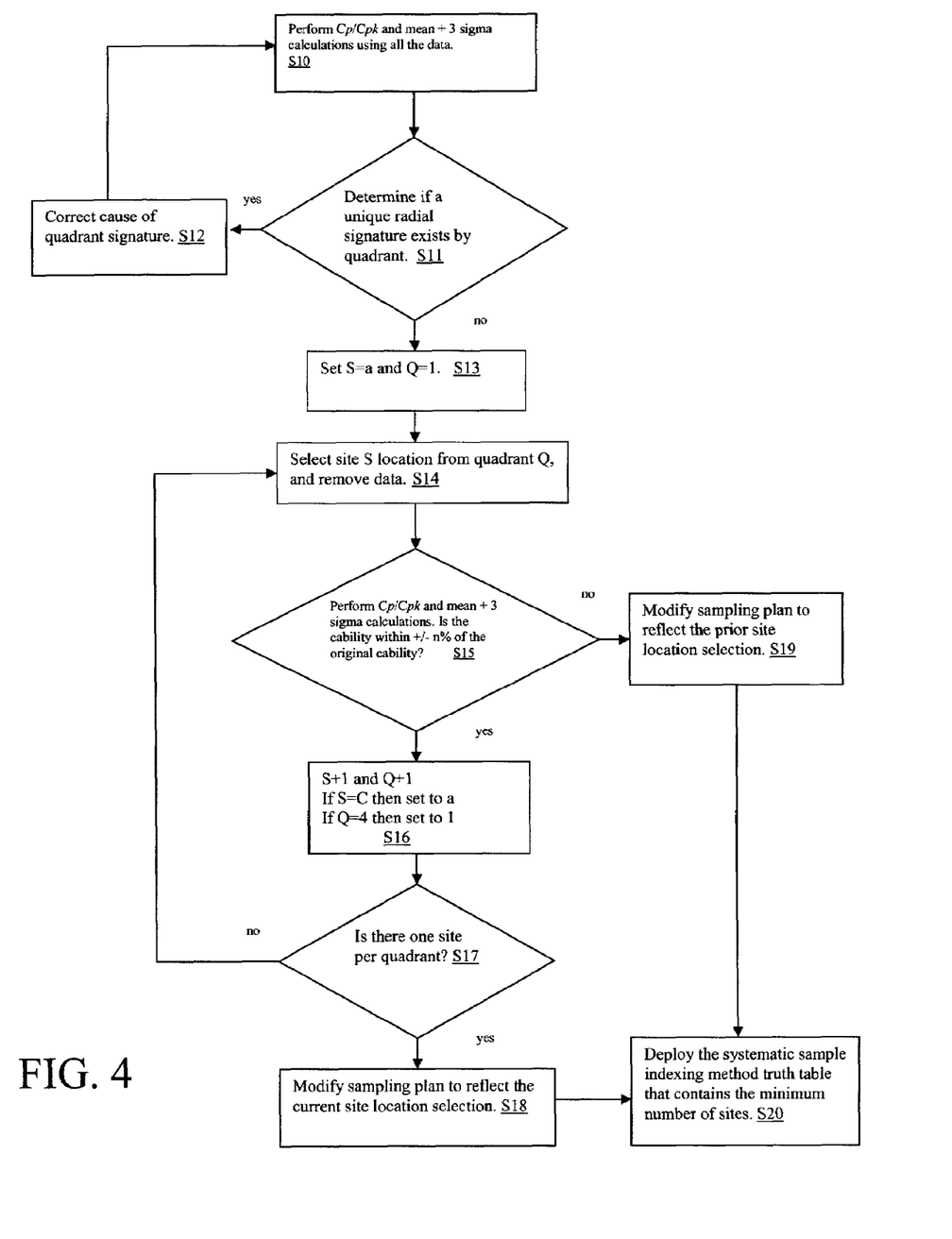
FIG. 4 depicts a flowchart for optimizing site-to-site sampling for the wafer shown in FIG. 3 indexing in accordance with the present invention.

Referring now to FIG. 4, a flow chart for implementing a wafer site sampling optimization is shown. At the first step, S10, Cp/Cpk and mean+3 sigma calculations are performed using the complete set of historical data. At step S11, a determination is made whether a unique radial signature exists by quadrant (i.e., a quadrant signature). A quadrant signature is indicated by analyzing the complete set of historical data for any data sets relating to a particular radial axis for each quadrant that exhibit a behavior considered problematic. If so, the cause of the quadrant signature needs first to be corrected at step S12, then new data must be collected, and the process begins again at step S10. If one quadrant of the wafer has different performance from the rest of the wafer, problems will arise when sites are removed from that location. Therefore, a determination must be made to ensure that such a condition does not exist. If the performance across the radius remains the same regardless of the quadrant, then the process can proceed. If no unique radial signature exists by quadrant, the site S is set to "a" and the quadrant Q is set to 1 at step S13. At step S14, the site/quadrant setting is selected such that its associated subset of data is removed from the set of historical data.

At step S15, Cp/Cpk and mean+3 sigma calculations are performed on the reduced data set to determine if the capability is within +/−n % (i.e., a predetermined threshold) of the original capability, where n can be selected based on any criteria required for the particular application. If the result is not within +/−n %, then the sampling plan is modified to reflect the prior site location selection at step S19. If the result is within +/−n %, then S and Q are incremented (if S=c, then increment S to "a" and if Q=4, then increment Q to 1) at step S16.

At step S17, a determination is made whether there is only one site S left per quadrant Q, meaning that the data cannot be further optimized. If not, the logic returns to step S14, where another site S is selected. If there is only one site S left per quadrant Q, then the sampling plan is modified to reflect the current site location selection at step S18. Finally, once the sampling plan is modified either at step S18 or step S19, a systematic sample indexing method truth table is deployed at step S20 that contains the minimum number of sites to be sampled.

Figure 5:
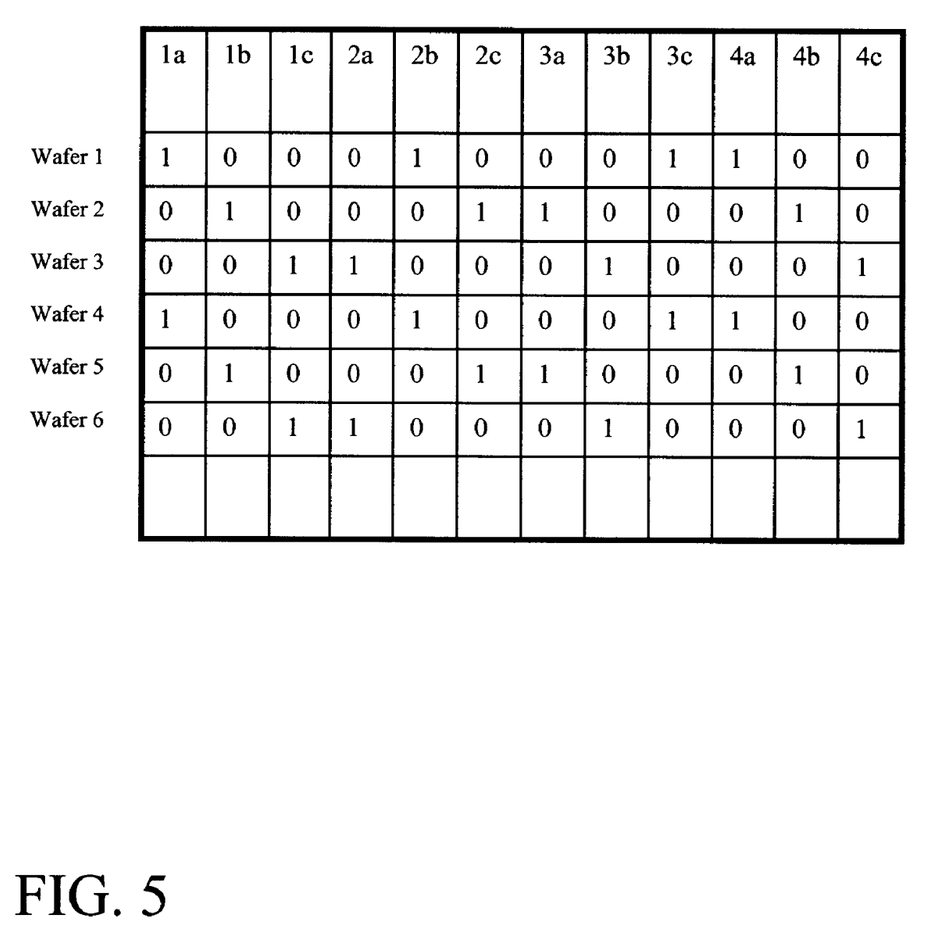
FIG. 5 depicts a truth table utilizing indexing for site-to-site sampling in accordance with the present invention.

An example of a sample indexing method truth table is shown in FIG. 5. In the table, each row represents a wafer, and each column represents a possible site that can be measured. As can be seen in this example, one site is measured from each quadrant. Moreover, the positions of the sites being measured are indexed within each quadrant, such that each position is eventually measured. For instance, in the first quadrant, site 1a is measured for Wafer 1, site 1b is measured for Wafer 2, and site 1c is measured for Wafer 3.

Figure 6:
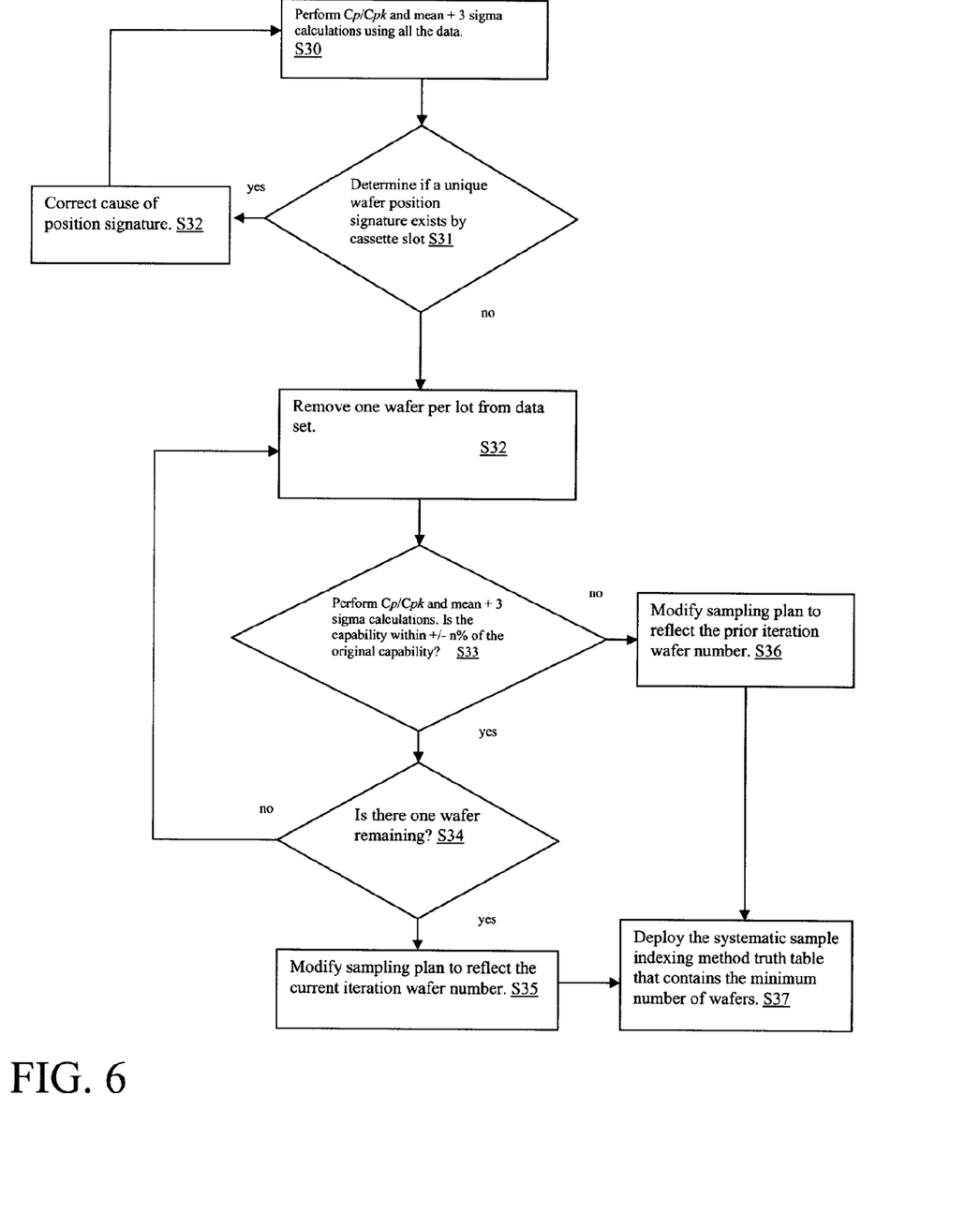
FIG. 6 depicts a flowchart for optimizing wafer-to-wafer sampling in accordance with the present invention.

Referring now to FIG. 6, a flow chart is shown for implementing an optimization for a wafer-to-wafer sampling. Wafers are generally processed together as a lot within a cassette, wherein a typical cassette might contain 25 wafers. In this case, the goal is to reduce the number of wafers being measured. Initially, a set of historical data is collected based on an initial sampling plan. One initial strategy may be to divide the cassette into four sections, C1, C2, C3 and C4, with each section containing six or seven slots, and have one wafer be required from each cassette section. Once a set of historical data is collected, the process can begin.

The first step, S30 is to perform Cp/Cpk and mean+3 sigma calculations using the complete set of historical data. Next, a determination is made whether a unique wafer position signature exists by cassette slot at step S31. In other words, based on an analysis of the complete set of historical data, does one of the wafer positions exhibit a behavior that is significantly different than the other positions? If so, the cause of the position signature is corrected and the process is begun again. If not, then data relating to one wafer per lot from the data set is removed at step 32.

At step S33, Cp/Cpk and mean+3 sigma calculations are performed on the reduced data set to determine if the capability is within +/−n % of the original capability, where n can be selected based on any criteria required for the particular application. If the result is not within +/−n %, then the sampling plan is modified to reflect the prior iteration wafer number at step S36. If the result is within +/−n %, then a determination is made at step S34 to see if only one wafer remains. If no, then the process is iterated by removing an additional wafer from the data set at step 32. If yes, then the optimization is complete and the sampling plan is modified at step 35 to reflect the current iteration wafer number.

Figure 7A:
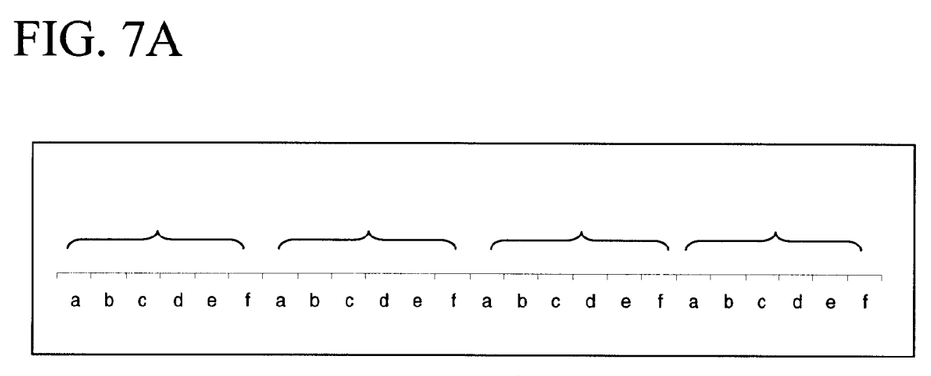
FIG. 7A depicts a wafer cassette in accordance with the present invention.
Figure 7B:
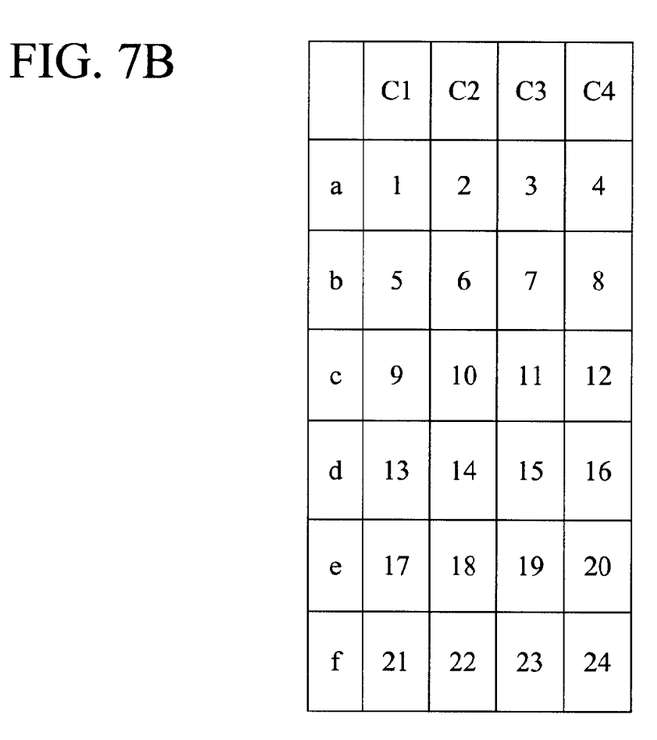
FIG. 7B depicts a truth table utilizing indexing for wafer-to-wafer sampling for the cassette of FIG. 7A in accordance with the present invention.

Finally, a systematic sample indexing method truth table is deployed at step S37 after the sampling is modified at either step S35 or S36. FIG. 7B illustrates a truth table that could be utilized to implement indexing for the 24 wafer cassette shown in FIG. 7A. As can be seen, the 24 wafer cassette is broken up into four sections, C1, C2, C3, and C4, with each section having six slots, a, b, c, d, e, and f. By utilizing the truth table shown in FIG. 7B, the sampling plan ensures that wafers are sampled from different locations of the cassette. In this particular example, it is assumed that only one wafer from each lot is to be measured. Each entry in the table refers to a lot number being sampled. Thus, for the first lot, the wafer from slot "a" of section C1 is measured, for the second lot, the wafer from slot "a" of section C2 is measured, and so on. Obviously, the truth table could be readily modified to handle situations where more than one wafer was being sampled from each lot.

It should be appreciated that the teachings of the present invention could be offered as a business method on a subscription or fee basis. For example, a computer system 10 comprising metrology sampling optimization table 18 could be created, maintained and/or deployed by a service provider that offers the functions described herein for customers. That is, a service provider could offer to provide sampling optimization services as described above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part of all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A method for optimizing a metrology sampling plan, comprising:
   providing a program product stored on a computer readable medium, which when executed, causes a computer to perform the steps of:
      collecting historical metrology data from a metrology tool;
      comparing an initial capability calculated from the historical metrology data with a recalculated capability for a reduced data set, wherein the reduced data set is obtained by removing a subset of data from the historical metrology data;
      determining whether the initial capability and recalculated capability will provide substantially the same process capability result;
      repeating the comparing step with different reduced data sets; and providing and storing an optimized reduced data set usable in a metrology operation;
   wherein the historical metrology data comprises data collected for individual wafers contained within a cassette, and wherein the subset of data comprises data for a wafer at a predetermined position within each cassette.

2. The method of claim 1, comprising the farther steps of:
   in response to determining that the initial capability and recalculated capability are not within a predetermined threshold, modifying the metrology sampling plan based on the reduced data set before the subset of data was removed;
   in response to determining that the initial capability and recalculated capability are within a predetermined threshold, determining whether, after the subset of data is removed, the reduced data set includes data for only one wafer in each cassette, and
      in response to determining that the reduced data set includes data for only one wafer in each cassette, modifying the metrology sampling plan based on the reduced data set; and
      in response to determining that the reduced data set includes data for more than one wafer in each cassette, removing a further subset of data, recalculating the capability, and repeating the steps of this claim.

3. The method of claim 2, comprising the farther steps of:
   in response to determining that the initial capability and recalculated capability are not within a predetermined threshold of each other, modifying the metrology sampling plan based on the reduced data set before the subset of data was removed;
   in response to determining that the initial capability and recalculated capability are within a predetermined threshold of each other, determining whether, after the subset of data is removed, the reduced data set includes data for only one site per quadrant, and
      in response to determining that the reduced data set includes data for only one site per quadrant, modifying the metrology sampling plan based on the reduced data set; and
      in response to determining that the reduced data set includes data for more than one site per quadrant, removing a further subset of data, recalculating the capability, and repeating the steps of this claim.

4. The method of claim 1, wherein the metrology data comprises data collected for wafer sites, and wherein the subset of data comprises data for a site at a predetermined quadrant and radial position on each wafer.

5. The method of claim 1, comprising an initial step of determining if a unique signature exists from the historical metrology data, and if so, correcting the cause of the unique signature before proceeding.

6. The method of claim 1, comprising the further step of implementing an updated sampling plan that includes an indexing strategy.

7. The method of claim 6, wherein the capability is determined using Cp/Cpk and mean+3 sigma calculations.

* * * * *